Patented Apr. 10, 1923.

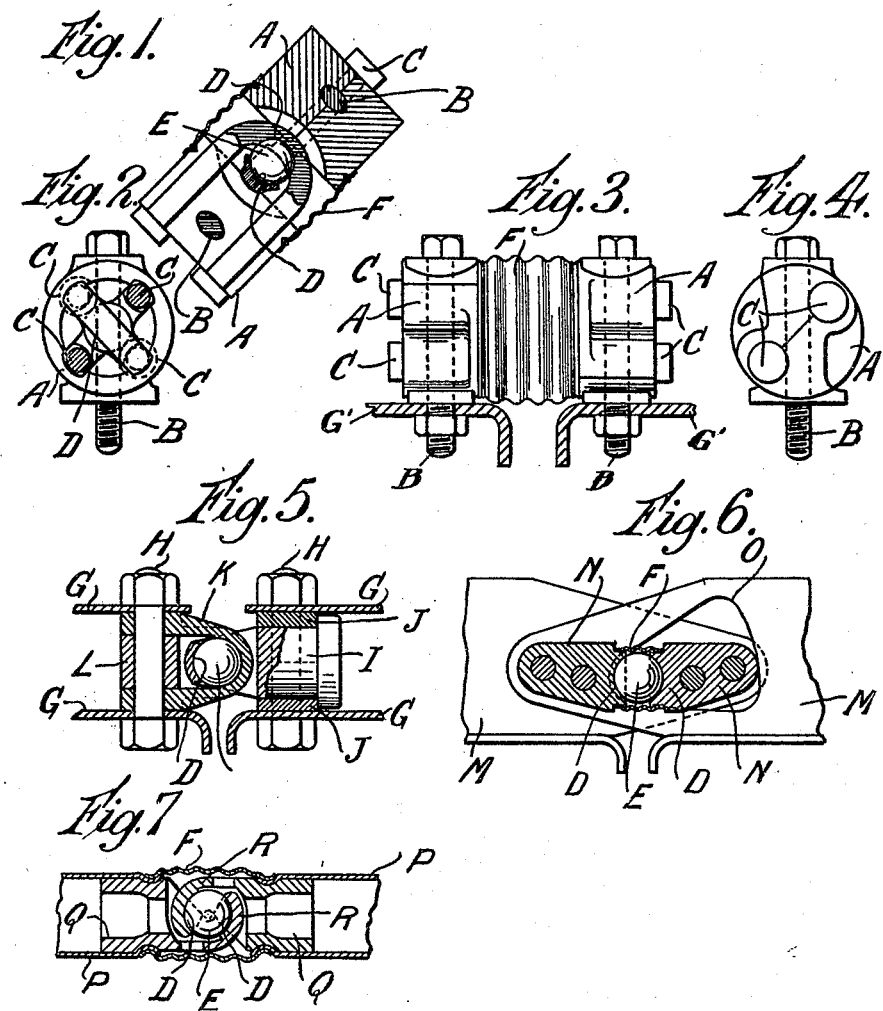

1,451,516

UNITED STATES PATENT OFFICE.

OSCAR STYLES PENN, OF OLD CHARLTON, LONDON, ENGLAND, ASSIGNOR TO ROADLESS TRACTION, LIMITED, OF LONDON, ENGLAND.

FLEXIBLE TRACK AND THE LIKE.

Application filed August 22, 1922. Serial No. 583,576.

*To all whom it may concern:*

Be it known that I, OSCAR STYLES PENN, a subject of the King of Great Britain, residing at Charlton House, Old Charlton, in the county of London, England, have invented certain new and useful Improvements in Flexible Tracks and the like, of which the following is a specification.

This invention relates to improvements in flexible tracks for track-laying vehicles and other like devices comprising units or members connected together to transmit tensile stress or "pull" from one unit or member to the next.

The object of the present invention is to provide improved connecting means between such members, which means shall be strong and of simple construction, and whereby friction and wear between the working parts will be reduced to a minimum.

According to this invention I provide at each end of each member a spherical surface and I interpose between the adjacent spherical surfaces of two adjacent members a ball.

The accompanying drawings illustrate embodiments of this invention.

Figure 1 is a longitudinal section through parts of two adjacent members of a flexible track embodying my improvements.

Figure 2 is a cross section thereof.

Figure 3 is a side view and Figure 4 an end view.

Figure 5 shows a modified arrangement of track joint in which each member is formed of two side plates secured by bolts.

Figure 6 shows another form in which the end of each member has riveted to it a socket.

Figure 7 shows another form in which each member is formed of a tube.

Referring to Figures 1, 2, 3 and 4, each member consists of a block A formed in two parts secured to one another by a screw B, which screws into one of the shoes of the track as indicated at G', Figure 3. The two parts of the block A grip between them the legs of a U-piece C, the ends of which are enlarged so that when the two parts are secured together the U-piece cannot be pulled out of the block. In the bend of the U-piece is formed a spherical surface or cup D, and between the cups of two adjacent members is inserted a hard ball E with the result that one member is free to turn about the other in all directions. In order to keep dust or dirt out of the joint between the two members I may provide a sleeve F of corrugated rubber tubing or the like, the extremities of which may fit into grooves at the adjacent ends of the two blocks.

Figure 5 shows a modified arrangement of track joint, in which each member is formed of two side plates or lengths G secured by bolts H. On one end of each member is a stud I, the head of which bears against a split bush J, and the shank of which is U-shaped and provided with a spherical surface or cup D. At the other end of each member is a U-piece K secured in position by the bolt H, a bush L being interposed between the legs of the U.

Figure 6 shows another form in which each end of each member M has riveted to it a socket N, provided with a spherical surface D, a ball E being interposed between the two sockets as before. In this case one end of each member should be cut away as at O in order that the socket on the other member may be able to move through the required angle. A rubber sleeve F, as shown, similar to the sleeve of Figures 1 and 3, is provided.

In the form shown in Figure 7 each member is formed of a tube P, the end of which is constricted to secure within it a piece Q, the outer end of which is formed as a hook R having a spherical surface D, a ball E being interposed as before.

While not necessarily limited thereto, my invention is especially adapted to flexible tracks for tractors or endless track vehicles, in which it is desirable that the track be flexible in all directions but that the joints be protected from dust and dirt.

What I claim is:—

1. In a chain or like coupling, a plurality of members, interlocking devices at the adjacent ends of two members each having an internal spherical surface, a ball interposed between adjacent spherical surfaces, and a flexible covering enclosing the joint thus formed to exclude dust.

2. In a chain or the like coupling, two members, each member being in two parts, means for securing the parts together, a U piece having enlarged ends secured between the parts, spherical surfaces in the bends of the U pieces and a ball interposed between adjacent spherical surfaces.

3. In a chain or the like coupling, two members, each member being in two parts, means for securing the parts together, a U piece having enlarged ends secured between the parts, spherical surfaces in the bends of the U pieces, a ball interposed between adjacent spherical surfaces and a sleeve secured to the adjacent ends of the blocks.

4. An endless track mechanism, track shoes, connections between adjacent track shoes comprising interlocking members carried by the shoes, anti-friction members between the interlocking members thus forming universal joints, means for connecting each interlocking member to its track shoe, and a flexible covering for each universal joint to exclude dust and dirt.

5. In endless track mechanism, two members, a U-piece secured to each member, said U-pieces interlocking, anti-friction means therebetween to form a universal joint, track shoes, means for securing the said members to the track shoes, and a flexible corrugated covering for each universal joint to exclude dust and dirt.

6. In endless track mechanism for tractor vehicles, a plurality of track shoes, connections for said track shoes comprising members carried thereby and having universal joints therebetween, and a flexible covering for each universal joint carried by said members.

In testimony that I claim the foregoing as my invention I have signed my name this 11th day of August, 1922.

OSCAR STYLES PENN.